United States Patent [19]
Nilsson

[11] 4,062,602
[45] Dec. 13, 1977

[54] BALL BUSHING

[75] Inventor: Sven Walter Nilsson, Partille, Sweden

[73] Assignee: SKF Nova AB, Goteborg, Sweden

[21] Appl. No.: 739,132

[22] Filed: Nov. 5, 1976

[30] Foreign Application Priority Data

Dec. 31, 1975 Sweden .............................. 7600006

[51] Int. Cl.² ............................................ F16C 29/06
[52] U.S. Cl. ................................. 308/6 C; 308/237 R
[58] Field of Search ............................ 308/6 C, 237 R

[56] References Cited
U.S. PATENT DOCUMENTS

| 3,891,284 | 6/1975 | Ernst | 308/6 C |
| 3,893,732 | 7/1975 | McCloskey | 308/6 C |
| 3,967,865 | 7/1976 | Walter et al. | 308/6 C |

Primary Examiner—Richard A. Bertsch
Attorney, Agent, or Firm—Eugene E. Renz, Jr.

[57] ABSTRACT

A ball bushing comprising a sleeve, a cage, inside the sleeve adapted to be mounted on a shaft member or the like. The ball bushing has formed therein a number of closed ball paths, the balls being loaded between the sleeve and the shaft in a section or zone of each ball path. The sleeve has a number of longitudinal profiles countersunk in relation to a circle circumscribing the sleeve. The profiles define internal raceways for the loaded balls. The sleeve is also characterized by a generally uniform or constant cross sectional shape along its entire length.

17 Claims, 4 Drawing Figures

BALL BUSHING

BACKGROUND OF THE INVENTION

The present invention relates to a ball bushing comprising a sleeve, a cage and a number of closed ball paths with balls guided by the cage, the balls being loaded between the sleeve and a shaft surrounded by the sleeve in a portion of each ball path, the ball paths having curved portions on each side of the loaded portions.

Such a ball bushing is previously known, for example, by the German published application, No. 2,333,336. Such ball bushings have advantageous properties, such as that they consist of only few separate parts, which simplifies manufacture and assembly, which in its turn makes it possible to provide inexpensive bushings. One important factor for obtaining a bushing with only few parts is that the outer sleeve is made of only one part, i.e., that no separate raceways for the loaded balls are provided in the sleeve. The whole sleeve must therefore be made of a material which is suitable for being provided with integral ball paths, i.e., preferably steel. This means, however, that the sleeve is comparatively difficult to work compared to a sleeve of, for example, in the shape of steel bars, which is a disadvantage, because it means that the bushing comprises more parts, and that the shape of the plastic sleeve will be comparatively complicated.

The manufacture of a sleeve such as the one shown in the above mentioned publication calls for several working operations, such as turning of grooves in the envelope surface and at the ends of the bore, the provision of a hexagonal bore, the provision of special cut-outs at the curved portions of the ball paths.

SUMMARY OF THE INVENTION

The object of the present invention is to provide a ball bushing comprising only a few separate parts, one of which being a load carrying sleeve made in one piece and which can be manufactured with a minimum of working operations, so that the bushing can be manufactured and assembled at a comparatively low cost. The bushing shall also have the ability of damping shock-loads and allow misalignment between the shaft and the sleeve. This object is achieved by giving the bushing the characteristic features stated in the below mentioned claims.

BRIEF DESCRIPTION OF THE FIGURES

With different embodiments of the invention also other advantageous properties can be obtained, which will appear from the following closer description of the invention with reference to the accompanying drawings; wherein.

DESCRIPTION OF SPECIFIC EMBODIMENTS

Figures 1, 2:
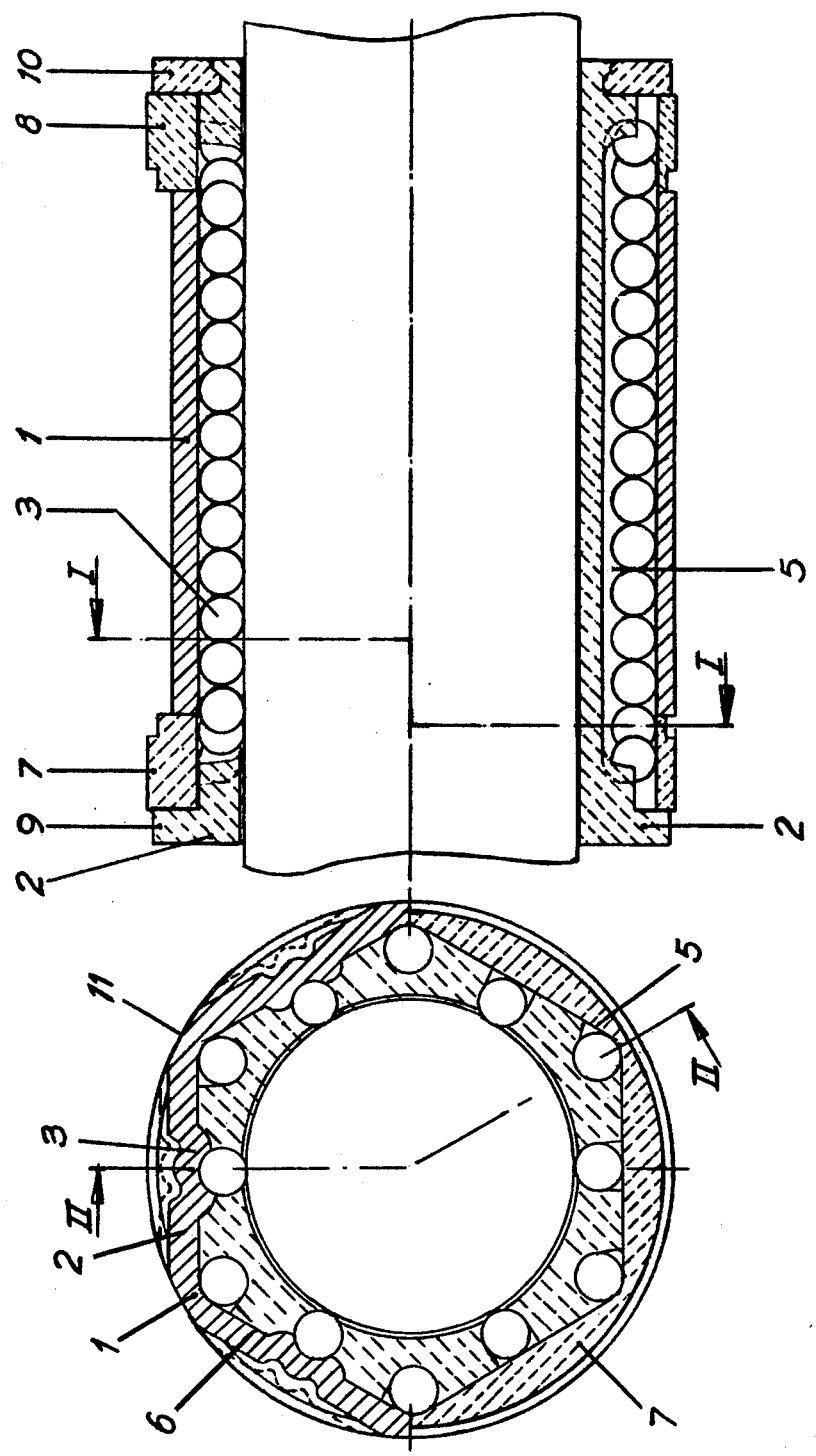
FIG. 1 shows a cross section according to I—I in FIG. 2.
FIG. 2 shows a longitudinal section according to II—II in FIG. 1 of one embodiment of a bushing according to the invention.

From FIGS. 1 and 2 it will appear that the bushing comprises a sleeve 1, a cage 2 and a number, six in the embodiment shown, of closed ball paths with balls 3 guided by the cage. The balls are loaded between the sleeve and a shaft 4 surrounded by the sleeve in one portion of each ball path. On either side of these loaded portions the ball paths have curved portions, which are connected to return portions parallel to the loaded portions. One return portion is referred to with reference numberal 5. In the loaded portions of the ball paths the sleeve 1 is provided with internal concave profiled raceways 6. In the embodiment according to FIGS. 1 and 2, the sleeve is provided with a polygonal cross section, in which the number of corners corresponds to the number of closed ball paths and where the return portions of the ball paths are suitated at the corners of the polygon.

The loaded portions of the ball paths are extended along the whole sleeve 1, and the sleeve has a mainly constant cross section shape along the whole length and a constant wall thickness around the whole circumference which means that sleeve blanks can be manufactured in long lengths, which are cut to desired sizes. This makes it possible to produce sleeves very efficiently. The sleeves can advantageously be produced by profiling of tubes, for example, by profile drawing of steel tubes.

The curved portions of the ball paths are situated outside the sleeve 1 on either side of the sleeve. These curved portions are surrounded by rings 7,8, which suitably have a circular circumference roughly corresponding to the circumscribed circle around the sleeve 1, and a bore profile which corresponds to the outer surface of the cage 2. In the embodiment shown in FIGS. 1 and 2, the bore shape is about hexagonal, which is shown in FIG. 1. The rings are suitably made of plastics, since they are not subjected to any great forces. Plastic rings of this shape can be manufactured with little difficulty at a low cost.

The assembly of the ball bushing can, for example, take place in the following manner: the ring 7, the sleeve 1 and the ring 8 are pushed from the right according to FIG. 2 over the cage 2 so far that a portion of each ball path more than one ball diameter long is left open, whereafter the balls are filled into the ball paths. Then the ring 7 is pressed against the flange 9 on the cage 2, the sleeve 1 against the ring 7 and the ring 8 against the sleeve 1, and a locking ring 10 is snapped into a groove at the right end of the cage 2. The locking ring 10 keeps the different parts of the bushing together as a unit.

The shape of the sleeve shown makes it possible to mount the bushing in a cylindrical seat which surrounds the sleeve. The sleeve will contact the seat with its six rim portions, which can be given a rounded shape, as shown in FIG. 1 at 11. By the fact that the sleeve does not contact the seat at the loaded portions of the ball paths, a bushing with a high elasticity is achieved, which means that the bushing has a good ability of taking up shock loads and allowing misalignments and eccentricity in relation to the shaft 4. If the rim portions 11 of the sleeve, which contact the cylindrical seat, are given a barrel shape, for example, by sphere grinding, the bushing can also be allowed to have a certain misalignment in comparison to the seat, which further extends the range of use for the bushing. Due to the shape of the sleeve the bushing can be tightened by contraction of a seat which surrounds the sleeve 1, for example, if the bushing is built into a slotted house, because the portions between the rims of the sleeve are bent inwards when the rims are pressed inwards, and the loaded portions of the ball paths are situated in these portions.

The rigidity of the bushing can be varied by variation of the wall thickness of the sleeve 1. If the wall thickness is increased, as shown by the dotted line in FIG. 1, the rigidity of the sleeve wall is increased, and the extension of the portions of the sleeve which do not contact the seat is decreased, which further improves the rigidity.

It is also possible to vary the rigidity of the bushing by varying the shape of the sleeve 1. If, for example, the hexagonal profile of the sleeve according to FIG. 1 is modified so that the portions between each corner are outwardly convex or describe an angle with the point directed outwardly in an unloaded state, i.e., that the cross section shape of the sleeve tends to be more circular, the elasticity increases, since the loaded portions of the ball paths will then cause strain stresses in the sleeve, which is thus easier to deform. If the profile instead is modified so that the portions between each corner are inwardly convex or describe an angle with the point directed inwardly, i.e., that the cross section shape of the sleeve is departing from the circular shape, then the loaded portions of the ball paths will cause buckling instead of bending in the sleeve, which improves the rigidity.

Figure 3:
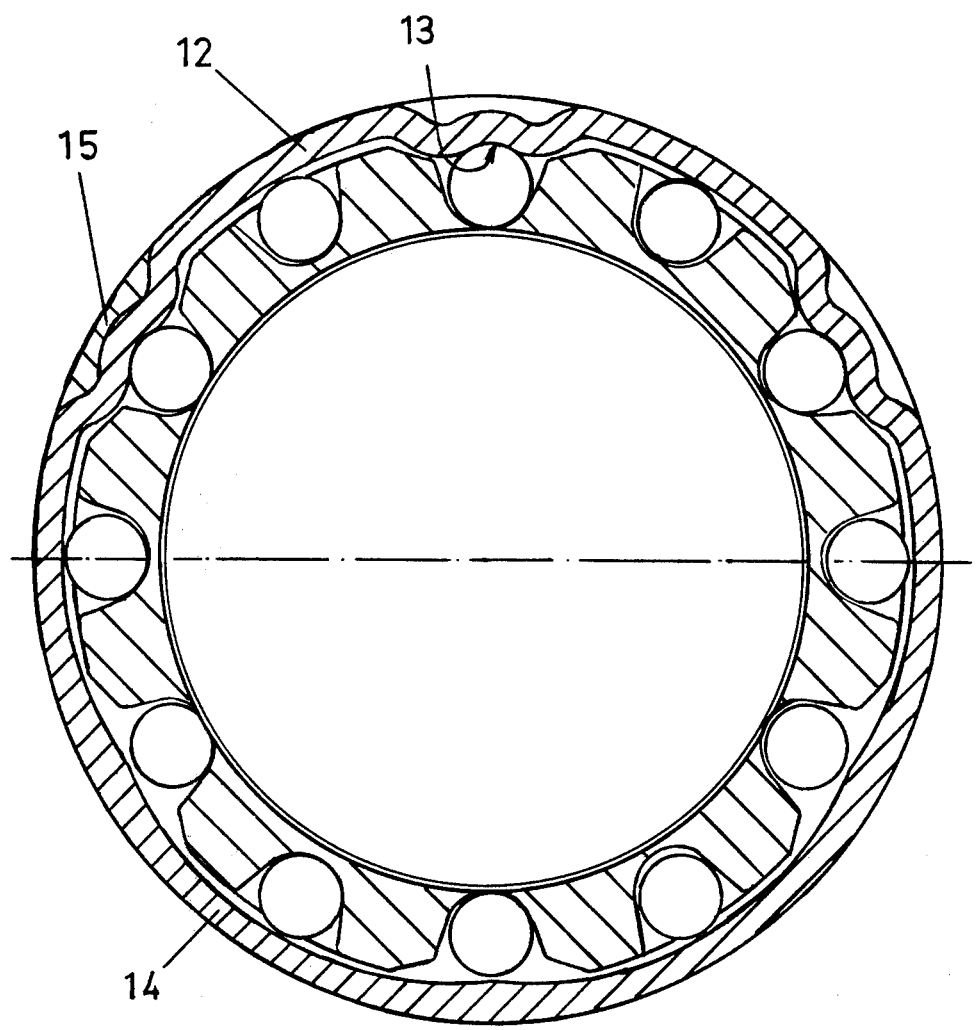
FIG. 3 shows a cross section of another embodiment of the invention.

In FIG. 3 a cross section of another embodiment of a ball bushing according to the invention is shown. The section is taken analogously with the section I—I in FIG. 2, i.e., the upper and the lower half of the figure shows different planes. According to this embodiment the cross section circumference of the sleeve has a circular general shape. A number of longitudinal corrugations in the sleeve constitute raceways 13 for the loaded balls. The portions of the sleeve constituting the raceways are countersunk in relation to the circumference of the sleeve, so that the raceways will maintain a certain radial elasticity, even if the sleeve is mounted in a cylindrical seat. If an elastic layer of, for example, rubber is provided at the outside of the sleeve outside the raceways, as shown with the reference numeral 15, a good sound absorption and an improved fixing in a surrounding seat is achieved. The resiliency of the raceways can also be modified in this way. The rings, one of which being shown in cross section with the reference numeral 14 in FIG. 3, which surround the curved portions of the ball paths, are, of course, so shaped, that their bore walls coincide with the shapes of the cage, which are surrounded by said rings.

Figure 4:
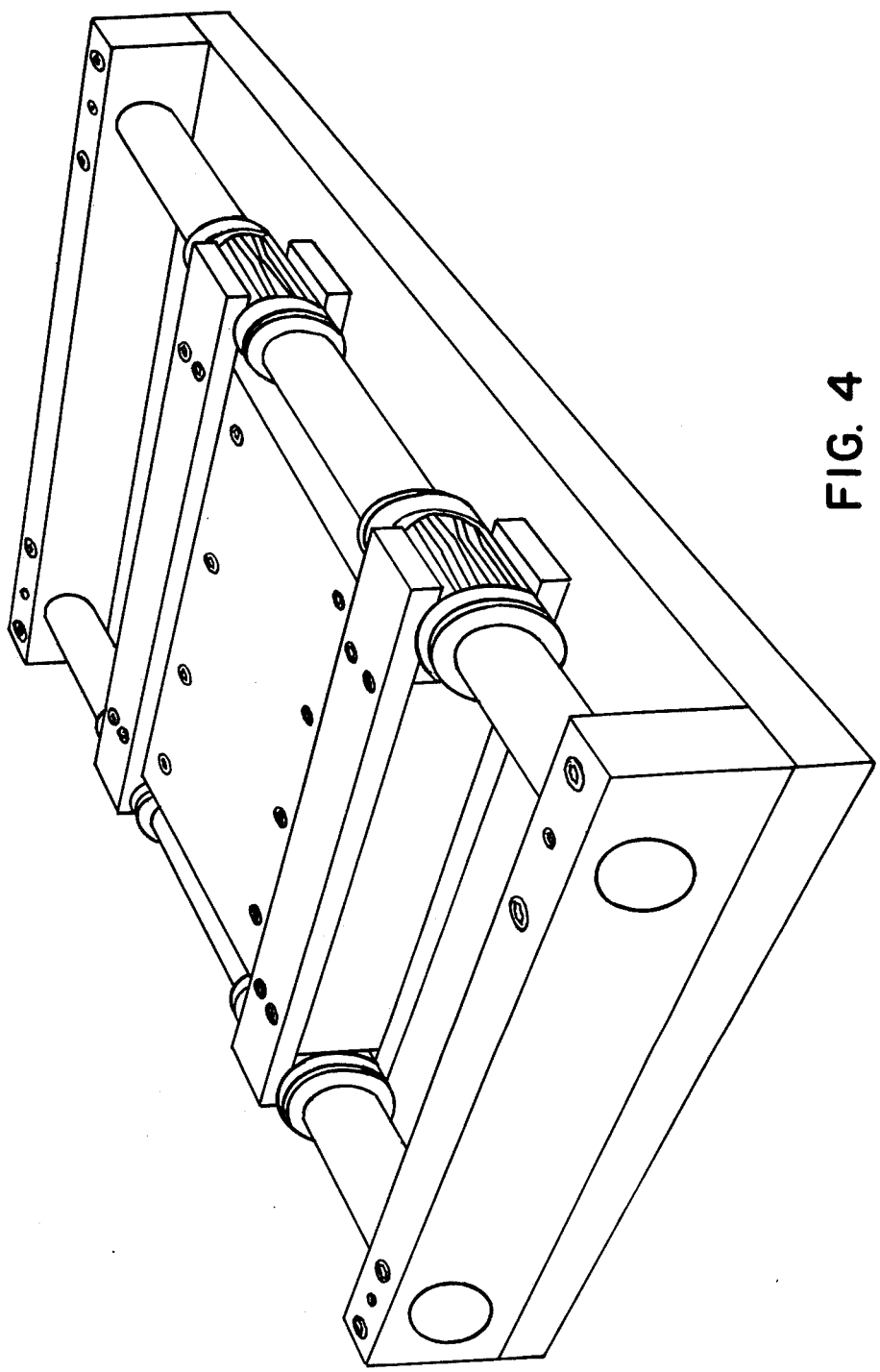
FIG. 4 shows one possible application of a bushing according to FIGS. 1 and 2.

In FIG. 4 a possible application of such bushings as shown in FIGS. 1 and 2 is shown. Since the outer shape of the sleeve 1 is mainly hexagonal, the sleeve can be inserted into a principally U-shaped seat with paralled sides, which simplifies the construction of the application and the mounting of the bushing. The application gives a low elasticity and a high rigidity in the bushing, since the seat is directly supporting the portion of the sleeve in which the loaded portion of the most loaded ball path is situated.

Also other embodiments of the invention than those described above are, of course, possible within the scope of the claims. For example, the ring 7 according to FIG. 1 can be integral with the cage 2, whereby the bushing comprises fewer parts while, on the other hand, the cage will be more complicated. The sleeve 1 can also have another polygonal shape than the hexagonal as shown. It is also possible that the locking ring 10 is integral with the ring 8, and also other methods for keeping the bushing together than by using locking ring and grooves are possible. A locking ring and grooves at both ends of the bushing can also be used instead of providing the cage with a flange. The sleeve can also be made of a band material, which has been rolled to a suitable profile and thereafter bent to a desired shape, whereby a slotted cage is achieved, if the edges of the band are not joined.

I claim:

1. A ball bushing comprising a sleeve, a cage and a number of closed ball paths with balls guided by the cage, the balls being loaded between the sleeve and a shaft surrounded by the sleeve in a section of each ball path, characterized by that the sleeve has a mainly constant sectional shape along its whole length and has a number of longitudinal profiles which are countersunk in relation to a circle circumscribing the sleeve, the profiles comprising internal raceways (6,13) for the loaded balls.

2. A ball bushing according to claim 1, characterized by that the curved portions of the ball paths on each side of the loaded portions of the ball paths are surrounded by members (7,8) which are separate in relation to the sleeve and are provided on either side of said sleeve.

3. A ball bushing according to claim 1, characterized by that the sleeve is made of a profiled tube with a mainly constant wall thickness around the whole circumference.

4. A ball bushing according to claim 1, characterized by that the cross section circumference of the sleeve (12) has a generally circular shape and that the sleeve has a number of longitudinal corrugations, which constitute raceways (13) for the loaded balls.

5. A ball bushing according to claim 1, characterized by that the sleeve has a mainly polygonal profile, in while the loaded portions of the ball paths are situated about halfway between each corner (11) and an unloaded return portion (5) is situated at each corner.

6. A ball bushing according to claim 5, characterized by that the polygonal profile of the sleeve is modified so that the portions between each corner are outwardly convex or describe an angle with the point directed outwardly in unloaded state.

7. A ball bushing according to claim 5, characterized by that the polygonal profile of the sleeve is modified so that the portions between each corner are inwardly convex or describe an angle with the point directed inwardly in unloaded state.

8. A ball bushing comprising a cage having an inner bore to receive a shaft member of the like, an elongated sleeve circumscribing the cage and means defining a number of closed ball paths in the sleeve and cage including a series of axially extending circumferentially spaced grooves in the cage wherein the balls are loaded between the sleeve and shaft, said sleeve having a plurality of longitudinally extending, circumferentially spaced rim portions and longitudinal profiles between said rim portions spaced radially inwardly of a circular trace through said rim portions.

9. A ball bushing as claimed in claim 8 wherein said sleeve is of generally uniform cross section for its entire length.

10. A ball bushing as claimed in claim 8 wherein said internal raceway is concave.

11. A ball bushing as claimed in claim 8 wherein the inner surface of each of said rim portions defines a raceway for the balls in the unloaded portion of the ball path.

12. A ball bushing as claimed in claim 8 wherein the sleeve is of polygonal cross section and the number of corners thereof defining the rim portions corresponds to the number of closed ball paths and the return portions of the ball paths are disposed at said corners.

13. A ball bushing as claimed in claim 8 adapted to be mounted in the cylindrical seat of a housing and wherein said rim portions are of an arcuate outer contour conforming to the cylindrical seat.

14. A ball bushing as claimed in claim 8 wherein said rim portions are of barrel-shaped cross section.

15. A ball bushing as claimed in claim 8 wherein said sleeve is of constant wall thickness.

16. A ball bushing as claimed in claim 8 wherein the wall thickness of said sleeve at the profiles is greater than said rim portion to provide increased rigidity.

17. A ball bushing as claimed in claim 8 including a housing having a cylindrical seat for mounting the ball bushing therein and a member made of an elastic material disposed between each of said profiles and said seat.

* * * * *